United States Patent [19]

Sefton et al.

[11] 4,165,413

[45] Aug. 21, 1979

[54] PROCESS FOR PRODUCING PHENOLIC FOAMS WITH A UNIFORM APPEARANCE

[75] Inventors: Robert H. Sefton, McMurray; John D. Carlson, Bradford Woods, both of Pa.

[73] Assignee: Koppers Company, Inc., Pittsburgh, Pa.

[21] Appl. No.: 944,038

[22] Filed: Sep. 20, 1978

Related U.S. Application Data

[63] Continuation-in-part of Ser. No. 886,895, Mar. 15, 1978, abandoned, which is a continuation-in-part of Ser. No. 825,772, Aug. 18, 1977.

[51] Int. Cl.$^2$ ............................................. C08J 9/14
[52] U.S. Cl. .................................... 521/128; 521/181
[58] Field of Search .............................. 521/128, 181

[56] References Cited

U.S. PATENT DOCUMENTS

| | | | |
|---|---|---|---|
| 3,210,300 | 10/1965 | Leiber et al. | 521/181 |
| 3,389,094 | 6/1968 | D'Alesandro | 521/181 |
| 3,704,269 | 11/1972 | Freeman et al. | 521/181 |

*Primary Examiner*—Morton Foelak
*Attorney, Agent, or Firm*—Herbert J. Zeh, Jr.; Oscar B. Brumback

[57] ABSTRACT

Improved phenolic foams are produced having a more uniform cell structure, improved mechanical and thermal properties, and improved foam structure by foaming a phenol-aldehyde oligomer condensate such as a resole, an extended resole, or a mixture of a resole and a novolac resin in the presence of N-methyl-2-pyrrolidone.

4 Claims, 6 Drawing Figures

PROCESS FOR PRODUCING PHENOLIC FOAMS WITH A UNIFORM APPEARANCE

CROSS-REFERENCE TO RELATED APPLICATIONS

This application is a continuation-in-part application of U.S. patent application Ser. No. 886,895 filed 3-15-78, now abandoned which is a continuation-in-part of U.S. patent application Ser. No. 825,772 filed 8-18-77.

BACKGROUND OF THE INVENTION

This invention related to a method for preparing improved foamed phenol-aldehyde condensates. More particularly, this invention relates to a method for preparing phenol-aldehyde condensate foams which are substantially free of splits, voids or blow holes and which have an increased uniform cell structure.

Phenol-aldehyde condensate foams, commonly called phenolic foams, generally are produced from resole resins rather than novalac resins. Resole resins, also known as Stage A resins or One-Step resins, are produced by the condensation reaction of approximately equal parts of phenol and an aldehyde in the presence of a basic catalyst. This reaction produces a complex mixture of condensate of phenol and the aldehyde which are soluble in alkali, alcohols, ketones and water to a degree. The resoles can react further to form resitols, Stage B resins, and resites, Stage C resins which are insoluble and infusible. Novolac resins are acid catalyzed condensates with a phenol to aldehyde ratio greater than one. These resins have very little, if any, cross-linking and are permanently fusible and soluble resins. Novolac resins are sometimes used in combination with resole resins in the production of phenolic foams and novolac resins can react further with aldehydes under basic conditions to produce resite-like products, but they are not usually used by themselves to produce phenolic foams.

Phenolic foams are all mostly of the rigid type and they are usually considered as having from about 40 to 60 percent open cells. Phenolic foams have advantages over other foamed resins such as polyurethane resin foams, in cost, thermal stability, fire resistance, resistance to humidity, chemical resistance, dimensional stability, smoke generation, electrical properties, and adaptability to foaming in place. The distribution pattern between open and closed cells also gives phenolic foams a certain amount of sound-insulation value as well as good thermal insulation. The phenolic foams also have a good density good of from less than 1 pound per cubic foot to about 80 pounds per cubic foot.

The desirability of producing phenolic foams for various applications has been recognized. These phenolic foams would be useful in the insulation market and the adoption of foamed-in-place phenolic insulation would be advanced appreciably by the development of equipment for continuous formation of phenolic foam.

Despite the above advantages and generally favorable economics, phenolic foams have not penetrated the insulation market. This is the result of the problem with current-day phenolic foams in that they have ruptured cell walls and splits and/or voids in the center of the foamed mass and they are subject to cavitation caused by blow holes or channels.

The art has proposed several methods for overcoming the above enumerated disadvantages of phenolic foams. One method includes the addition of nitrogen compounds, such as heterocyclic nitrogen-containing compounds like 2,3-N-methylpyrrole, to the resole resin to be foamed. Also, another method involves the use of certain blowing agents like polyhalogenated fluorocarbons to overcome the above mentioned disadvantages.

In U.S. Pat. No. 3,704,269 (Freeman et al.) a process is disclosed for preparing an insoluble, infusible cellular foam by reacting one part by weight of an aldehyde condensation polymer with active alkylol groups with 0.05 to 2.0 parts by weight of a nitrogen compound to produce a liquid resin. The nitrogen-containing compound is selected from substituted primary aromatic amines, substituted bis(aminoaryl) compounds, aminonaphthalenes, heterocyclic nitrogen-containing compounds, selected from the group consisting of 2,3-; 2,4-; 1,6-; or 3,4-diaminopyridine, pyrrole; N-methylpyrrole; 2,4-dimethylpyrrole, or 4,6-diaminopyrimidines. Then an alkylene donor like an aldehyde and a foaming agent are added to the liquid resin, and the resin composition is expanded to produce a foam product.

In U.S. Pat. No. 3,389,094 (D'Alessandro), closed-cell phenolic foam structures of fine cell size are provided by foaming a phenol-formaldehyde resin containing less than 10% water with a polyhalogenated fluorocarbon foaming agent. The fluorocarbons display an unusual and unique solubility phenomenon in the resole resin. They are uniquely soluble during the initial stages of the condensation thereby providing for uniform distribution of the blowing agent resulting in a longer vaporization period which is the probable cause of the fine cell structure of the foams. This patent also teaches that upon addition of the fluorocarbons to the resin mix there is no dilution effect and there is often an appreciable increase in viscosity. Such an increase in viscosity appears to be a contradiction to the teaching that the fluorocarbons are uniquely soluble in the resin mix.

It is also well known in the art of plastic foams as disclosed in U.S. Pat. No. 3,210,300 (Leibu et al.) to prepare polyether and polyurethane foams that are open celled and resilient with the use of a cell regulator. The cell regulator is an alkylated amine, or a mixture of an amide and a low molecular weight aliphatic sulfoxide, or a mixture of an amide and a low molecular weight sulfone. The preferred amides are N-methylpyrrolidone; N,N-dimethylacetamide, and espcially N,N-dimethylformamide. These cell regulators are used in a one-shot foaming technique in either batch or continuous processes. Generally the cell regulator should not be mixed directly with the diisocyanate but it should be added simultaneously with other ingredients to the diisocyanate or it should be added to a mixture of ingredients which are then added to the diisocyanate. The greater the amount of cell regulator employed, the greater will be the permeability of the resulting foam. The increase in permeability with larger quantities of cell regulator appears to result from a more complete removal of the membrane-like films or windows between cells.

The invention described herein is an improvement over the prior art because the prior art fails to teach how to make a phenolic foam that does not have the majority of its cell walls ruptured and is substantially free of splits and voids in the center of the large mass of foam or on the surface of the foam.

SUMMARY OF THE INVENTION

In accordance with the present invention, a process is provided to produce phenol-aldehyde condensate foams that do not have as many ruptured cells walls and do not have splits or voids but rather have a more uniform cell structure.

We unexpectedly have found that a phenolic foam having a more uniform appearance and an improved cell structure with little or no splits or voids can be produced by foaming a foamable phenol-aldehyde resin in the presence of N-methyl-2-pyrrolidone. The amount of N-methyl-2-pyrrolidone is within the range of about 0.25 to about 5.0 parts per one hundred parts of phenol-aldehyde resin (PHR). Higher amounts could be used but the cost would be prohibitive and would yield a foamable blend having a higher heat capacity and higher heat of vaporization. Both of these physical characteristics would be detrimental to the resulting phenolic foam. Lower amounts than 0.25 PHR could be used but these smaller amounts would not give the same degree of beneficial effect as an amount above about 0.25 PHR.

The N-methyl-2-pyrrolidone can be added to the foamable phenolaldehyde resin, the blowing agent, the catalyst, or separately added to the foamable mixture. All of the N-methyl-2-pyrrolidone can be added to one of the above, or the N-methyl-2-pyrrolidone can be distributed in two or more of the above or added separately. The important aspect is that the N-methyl-2-pyrrolidone be uniformly distributed throughout the foamable system prior to the actual foaming of the mixture.

The foamable mixture of the present invention generally comprises a foamable phenol-aldehyde resin, from 4 to about 20 PHR of a blowing agent, from about 0.25 to about 5.0 PHR of N-methyl-2-pyrrolidone, and an acid catalyst. The mixture also contains surfactants and other additives commonly used in the preparation of phenolic foams. The process of the invention comprises foaming the above mixture and curing the foam at an elevated temperature in the range of about 85° to 100° C.

The process of the present invention may be carried out in a batch process or in a continuous process. In a batch process the ingredients of the foamable mixture are mixed together with the catalyst generally added last and then foamed and cured. In a continuous process the ingredients are metered onto a mixing apparatus which deposits the mixture onto a substrate. The mixture is then foamed and cured. In the continuous process there may be a separate stream for each of the ingredients or two or more of the ingredients may be pre-mixed. It is preferred that the N-methyl-2-pyrrolidone be pre-mixed with the blowing agent and/or the foamable phenol-aldehyde resin.

One of the preferred processes of this invention comprises: (a) mixing an amount of N-methyl-2-pyrrolidone in the range of about 0.25 to about 5.0 PHR with from about 4 to about 20 PHR of a blowing agent; (b) mixing the mixture of N-methyl-2-pyrrolidone and blowing agent a foamable phenolaldehyde resin to produce an emulsion; (c) initiating the polymerization of the emulsion with the addition of an acid catalyst thereby initiating the foaming of the emulsion; and (d) curing the foam at an elevated temperature of around 85° to around 100° C.

Another preferred process of this invention comprises: (a) mixing an amount of N-methyl-2-pyrrolidone in the range of about 0.25 to about 5.0 PHR with a foamable phenol-aldehyde resin; (b) mixing from about 4 to about 20 PHR of a blowing agent with the above mixture to produce an emulsion; (c) initiating the polymerization of the emulsion with the addition of an acid catalyst, thereby initiating the foaming of the emulsion; and (d) curing the foam at an elevated temperature of around 85° to around 100° C.

As an alternative, part of the N-methyl-2-pyrrolidone may be mixed with the blowing agent and part of the N-methyl-2-pyrrolidone may be mixed with the foamable phenol-aldehyde resin. It is also within the scope of this invention to add the N-methyl-2-pyrrolidone with catalyst or partially with the catalyst and the remainder with the foamable phenol-aldehyde resin and/or blowing agent. It is also within the scope of this invention to separately meter the N-methyl-2-pyrrolidone with the other ingredients. As long as the N-methyl-2-pyrrolidone is evenly distributed throughout the foamable mixture before foaming, the benefits of the present invention will be realized.

In addition, other additives may be used and are preferred in producing the phenolic foam of the present invention; for example, surfactants and other agents known to those skilled in the art of foamed plastics.

The term "PHR" used throughout the specification and in the claims is an abbreviation for "parts per hundred parts of resin". For example, as used in plastics formulations, 5 PHR means that 5 pounds of an ingredient would be added to 100 pounds of resin.

DESCRIPTION OF THE INVENTION

Figure 1:
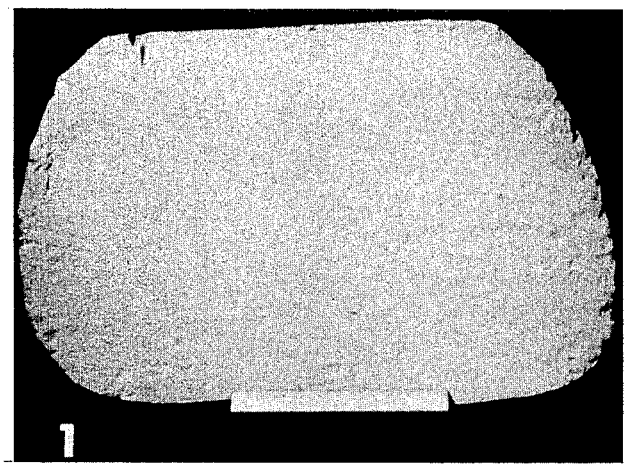
FIG. 1 is a photograph showing the grain structure of a cross section of a phenol-aldehyde foam billet where N-methyl-2-pyrrolidone was incorporated into the foamable resin mixture.

Phenol-aldehyde resins that can be used in the process of this invention are generally liquid, water-soluble, or water emulsifiable resole type resins known as A stage resins. These resins are produced by reacting phenol and an aldehyde, preferably formaldehyde, in an equal molar ratio or with excess formaldehyde in an alkaline medium. First, the phenol reacts with formaldehyde to form the condensation products ortho- or para-methylolphenol. Methylolphenol then reacts with another molecule of phenol, with the loss of water, to form a compound in which two rings are joined by a —CH$_2$— link, diarylmethane. These resins are soluble in alkalies, alcohols, ketones, and to some extent, water. As average molecular weight of the condensation product increases, the water compatibility or miscibility decreases. The resoles consist mainly of a complex mixture of phenol alcohols with a relatively high hydroxyl content.

Also, aqueous phenol formaldehyde resins can be produced by reacting phenol and formaldehyde under controlled reaction conditions and with a controlled excess of free formaldehyde. In this case the resin is first prepared by reacting the phenol and formaldehyde in certain critical proportions in the presence of a critical proportion of a basic catalyst. The reaction is continued until an end point of less than a certain weight percent of free phenol is achieved based on the weight of the phenol formaldehyde resin solids. Also, the phenol formaldehyde resins can be formed in a two-stage process wherein the first stage of the reaction is carried out under novolac-forming conditions and the second stage is conducted at resole-forming conditions with a basic catalyst.

Many different compounds can be used as the phenol or aldehyde in forming the phenol-aldehyde resole resins. Compounds which can be used as phenols include both phenol and its homologues, such as cresols and xylenols, or mixtures of these compounds. The aldehydes reacting with the phenols comprise, for example, formaldehyde, acetaldehyde, furfural, and other aldehydes as well as mixtures of these compounds. In addition, aldehyde producing compounds may be used; for example, compounds decomposing to formaldehyde, such as paraformaldehyde, hexamethylenetetramine, methylol, trioxane, tetraoxymethene, and others, as well as mixtures of these compounds. The phenolic compounds other than phenol, and the aldehydes other than formaldehyde or its polymeric forms generally react at a slower rate than phenol and formaldehyde, therefore, according to the invention, phenol-resole resins of phenol and formaldehyde are preferably used. The resole resin may also contain extenders other than the novolac resin, such as resorcinol still bottom, ammonium lignosulfonates, and the like. In addition, the resole resin may contain other agents like fire retarding agents. Two resole resins that operate well with the present invention, but to which the present invention is not limited, are a resole resin sold by Union Carbide Corporation under the tradename "BRL-2760" and a resole resin sold by Reichhold Chemical Inc. under the tradename "Plyophen DR-391."

In the present invention it is preferred to use N-methyl-2-pyrrolidone which is represented by the formula:

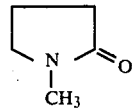

It is also within the scope of the present invention to use substituted N-methyl-2-pyrrolidone wherein the substituents may be halogens or alkyl groups. The alkyl groups or halogens can be at any position of the ring and the alkyl groups can have from about one to about 10 carbon atoms. Preferably the alkyl groups are saturated. The amount of N-methyl-2-pyrrolidone or halogen or alkyl derivatives of N-methyl-2-pyrrolidone used is in the range of about 0.25 to around 5.0 PHR (parts per hundred parts of resin). The amount may be greater than 5.0 but such a use would be more expensive and would not yield any additional benefits. Actually, the use of more than around 5.0 PHR could be detrimental to foaming because of a resulting higher heat capacity and heat of vaporization in the resole emulsion. An amount less than 0.25 PHR could be used but the beneficial effect would not be sufficient to produce a good product.

Some examples of types of blowing agents which are useful in the process and composition of this invention are the polyhalogenated saturated fluorocarbons, the halogenated hydrocarbons, particularly fluorocarbons, hydrocarbons or mixtures thereof which have an atmospheric pressure boiling point of about −40° F. (−40° C.) to about 200° F. (93° C.). A few examples of the numerous suitable blowing agents include: chlorinated and fluorinated hydrocarbons, such as chloroform, methylene chloride, trichlorofluoromethane, tetrafluoromethane, 1,1,2-trichloro-1,2,2-trifluoroethane; monochlorodifluoromethane; dichlorodifluoromethane; 1,1-dichloro-1,2,2,2-tetrafluoroethane; 1,2-dichloro-1,1,2,2-tetrafluoroethane; 1,1,1-trichloro-2,2,2-trifluoroethane; 1,2-difluoroethane; bromotrifluoromethane; 1,1,2,2-tetrachloro-1,2-difluoroethane; 1,1,1,2-tetrachloro-2,2-difluoroethane, or any mixtures of these compounds. The preferred polyhalogenated fluorocarbons used in the process of this invention are the fluorcarbons marketed under the designation Refrigerants 11 (trichlorofluoromethane) and 113 (1,1,2-trichloro-1,2,2-trifluoroethane). These refrigerants are available commercially under the following names from the following companies: "Freon" from I. E. DuPont DeNemours & Co.; "Ucon" from Union Carbide Corporation; "Genitron" from Allied Chemical Corporation; and "Isotron" from Pennwalt Corp. In addition, other blowing agents such as hydrocarbons like acetone or butane or pentane or mixtures thereof or mixtures with the aforementioned blowing agents can be used. Also, other blowing agents include alcohols, ketones or aldehydes that vaporize under conditions of the present invention, i.e., a temperature in the range of about 20° C. to about 100° C., and that have a substantial vapor pressure under 100° C., may be used in the process and composition of the present invention.

Any catalysts which will enhance the cross-linking and foaming reaction can be employed in the process of the present invention. The preferred catalysts are aromatic sulfonic acids of which a few examples are: benzene sulfonic acid, i.e. phenolsulfonic acid, toluene sulfonic acid, xylene sulfonic acid, and phenol sulfonic acid. These aromatic sulfonic acids may be used alone or in combination with each other or in admixture with other acids such as phosphoric acid.

In addition to the above mentioned compounds, other additives may be used in producing the phenolic foam of the present invention. One such additive is a surfactant. Suitable surfactants employed in the process of this invention include silicone-/ethylene-oxide/propylene-oxide copolymers, alkoxy silones, polysilylphosphonates, polydimethyl siloxane, and polydimethylsiloxane-polyoxyalkylene copolymers and any other surfactant known to those skilled in the art to be useful in phenolic foams and similar chemical environments. Specific, commercially available surfactants that may be used in the present invention include, among others, polydimethylsiloxane-polyoxyalkylene block copolymers available from the Union Carbide Corporation under the designations "L-5420" and "L-5340", and from the Dow Corning Corporation under the designations "DC-193" and "DC-195". An amount of surfactant in the range of about 0.0 to about 3.0 parts per hundred parts (PHR) of resin may be added to the blowing agent and/or the foamable phenol-aldehyde resin. When a surfactant is used, it is used to reduce the surface tension of the resole during foaming and aids in reducing interfacial tension between the resole and blowing agent and any other ingredients subsequently added. Also, any other additive may be used in the present invention that is known by those skilled in the art to be useful in producing phenolic foams.

It is preferred to have a surfactant in the foamable phenol-aldehyde resin that is insoluble in the blowing agent. An example of such surfactant is L-5420. It is also preferred to have a surfactant in the blowing agent that is insoluble in the foamable phenol-aldehyde resin. This is especially true when the N-methyl-2-pyrrolidone is not added to the blowing agent prior to addition to the other ingredients. An example of a surfactant for the blowing agent is L-5340.

The foamable mixture of the present invention comprises a foamable phenol-aldehyde resin, from about 4 to about 20 PHR, preferably from about 4 to about 12 PHR, of blowing agent and from about 0.25 to about 5.0 PHR of N-methyl-2-pyrrolidone. The mixture is foamed by adding an acid catalyst and is preferably cured after foaming by heating to 60° to 100° C. As mentioned herein, the ingredients may be added in any order so long as the resulting emulsion is uniform. The foamable mixture is an emulsion and hence the mixing of the phenol-aldehyde resin, blowing agent and N-methyl-2-pyrrolidone must be accomplished with a strong mixing action to form a good emulsion. Also, the strong mixing is necessary to entrain air for aiding foam formulation. The strong mixing action can be accomplished by such known mixing devices as high-shear, gear cut, or pin type mixers at an r.p.m. in the range of 1500–5500.

This emulsion is foamed by adding and mixing to it an amount of catalyst in the range of about 4 to about 8 PHR. The specific amount of catalyst used depends on the acidity of the specific catalyst used. Therefore, the specific amount used varies to some degree within the above-mentioned range depending on the specific catalyst used. After the catalyst is mixed with the emulsion, the catalyzed emulsion begins to cream. The cream period wherein nucleation occurs is the beginning of foaming. Nucleation is the formation of a bubble from the blowing agent generating a gas in the emulsion and the gas reaches its saturation limit and becomes supersaturated and finally comes out of the emulsion in the form of a bubble. This period can last as long as 1.5 minutes. As more bubbles are formed and as the bubbles grow the foam volume increases. This rise period can last up to around six minutes.

The mixing and foaming operations can occur at ambient temperatures. If ambient temperatures are not above about 15° C., then heat should be applied to the mixing and foaming steps. Enough heat should be provided to bring the temperature within the range of about 15° C. to about 40° C. During the foaming period the foamed resin develops sufficient strength to hold the foam, but it may not develop full strength for several days if it cools to room temperature. When practical, the foamed resin is often postcured for about 1 hour to about 10 hours at 100° C. to develop maximum physical properties but this postcuring is not preferred for commercial operation.

The foamable phenol-aldehyde resin, blowing agent, N-methyl-2-pyrrolidone are mixed in standard mixing pots known to those skilled in the plastic foam industry. Then this foamable emulsion and catalyst are mixed in a mold or in a mixing pot and immediately transferred to a mold. Sometimes air is whipped into the mixture to serve as seeding nuclei for the foaming. Rapid foaming is essential to uniformity of the foam, particularly when making a low-density foam. The reaction is exothermic and the heat generated increases the rate of reaction and vaporizes water which also speeds the reaction.

Also, the mixing and foaming may be performed in a continuous apparatus like the machines used to produce foamed polyurethanes. These foam machines consist of a mix head where the foamable resin mixture and catalyst are mixed, and conveyor type belts on which the mixture of foamable resin and catalyst are deposited for foaming and curing. These polyurethane foam machines must be modified to be applied to phenolic foams. These modifications include: the replacement of conduits by stainless steel conduits; the replacement of less powerful pumps with more powerful pumps, since phenolic resins are more viscous than urethane resins; and the addition of another process step, since polyurethanes can be compounded in a simple mixer, but resole emulsions must be agitated with a high energy mixer. Therefore, two conduits would lead to the mixing head, for example, a mixing head available from Admiral Equipment Co. designated as Model 100-3P. One conduit for the foamable emulsion, comprising foamable phenol-aldehyde resin, N-methyl-2-pyrrolidone, blowing agent, and surfactant, and another for the foaming catalyst. It is possible to place a stronger mixer in the mixing head and have three conduits leading to the mixing head, for example, a mixing head available from Afros s.r.l. of Varese, Italy, and designated as Model C-60-2.

In the preferred embodiment of this invention for continuous application, the Model C-60-2 three-conduit mixing head from Afros s.r.l. is used. In this case, one conduit contains the foamable phenol-aldehyde resin with added surfactant, another conduit would contain the blowing agent with surfactant, and the third conduit would contain the foaming catalysts. The N-methyl-2-pyrrolidone may be pre-mixed with the foamable phenol-aldehyde resin. The N-methyl-2-pyrrolidone may also be pre-mixed with the blowing agent or the catalyst. The N-mythyl-2-pyrrolidone may also be pre-mixed with two or more of the foamable phenol-aldehyde resin, blowing agent and catalyst. It is very difficult to stabilize a mixture of the N-methyl-2-pyrrolidone and catalyst and, therefore, it is preferred that none of the compound be present in the catalyst. Between the blowing agent and foamable phenol-aldehyde resin it is preferred that the N-methyl-2-pyrrolidone be present in the phenol-aldehyde resin. The N-methyl-2-pyrrolidone is more compatible with the resin and when pre-mixed with the blowing agent tends to adversely affect the seals and the like of the mixing equipment.

The resole resin that is preferably used in "BRL-6267" made by Union Carbide Corporation. To this foamable phenol-aldehyde resin there is added an amount of silicon surfactant in the range of about 0.5 to about 2.5 PHR and the N-methyl-2-pyrrolidone in the amount of 0.25 to 5.0 PHR. The mixture of resole surfactant and pyrrolidone is conveyed by one conduit to the mixing head. In a second conduit there is the blowing agent, preferably Refrigerant 11 (trichlorofluromethane), containing about 0.25 to 2.5 PHR of a silicone surfactant. This mixture is conveyed to the mixing head by the second conduit in such a manner that about 4 to about 12 PHR of Refrigerant 11 are mixed in the mixing head with 100 PHR of foamable phenol-aldehyde resin containing surfactant and N-methyl-2-pyrrolidone. A third conduit conveys to the mixing head the phenolsulfonic acid in a 50 percent aqueous solution. Preferably, the catalyst solution also contains around 15 percent by weight of phosphoric acid to increase the fire resistance of the phenolic foam. The solution of 50 percent phenolsulfonic acid is conveyed to the mixing head in such a fashion that about 6 PHR to about 8 PHR is mixed in the mixing head with 100 PHR of foamable phenolaldehyde resin.

Also in the preferred embodiment, the mixed components are deposited through a nozzle onto a conveyor belt containing a substrate sheet such as Kraft paper, including corrugated paper or board, impregnated felts, either organic or inorganic, glass mats, foil craft laminates or plastic films. The nozzle traverses the conveyor belt and deposits the catalyzed foamable emulsion on the substrate for the width of the belt. Then a top piece of substrate is placed on the catalyzed emulsion, consisting of the mixed components from the three conduits, that continues to foam. The conveyor belt carries the foaming substance a distance until foaming is complete. Then the conveyor belt carries the laminated phenolic foam into a pressure laminator wherein the phenolic foam is cured. The laminated phenolic foam is then postcured at a temperature in the range of about 60° C. to about 100° C. for about 3 to 10 minutes. Any type of heating equipment may be used that is known to those skilled in the art of foaming polymeric materials, but preferably an oven-type heater is used. The foamed bun produced after curing may be cut in any fashion known to those skilled in the art to provide foam board suitable for the insulation market and construction and building industry.

In an alternative embodiment of this invention, a two conduit modified polyurethane foaming machine is used to produce the phenolic foam by the process of this invention. A resole resin which is preferably "BRL-2760" available from Union Carbide Corporation or, alternatively, "Plyophen DR 391" available from Reichhold Chemical Inc. or, alternatively, "RI 6423" produced by Monsanto Company, which can be extended with 0.10 PHR of a 50% aqueous solution of ammonium lignosulfonate. To this resole mixture, there is added an amount of silicone surfactant, preferably "DC 193" available from Dow Corning Corporation, in the range of about 0.5 to around 2.5 PHR. To this resole mixture containing extended resole resin, and silicone surfactant, a mixture is added that contains N-methyl-2-pyrrolidone in an amount of around 2 PHR and Refrigerant 11, (trichlorofluoromethane), in an amount of about 4 to about 12 PHR. This combination is mixed with high speed agitation in a suitable mixing and holding vessel known to those skilled in the art to produce an emulsion. This emulsion is conveyed by one conduit of the modified foaming machine to the mixing head in the foaming machine.

Another conduit in the modified foaming machine conveys phenolsulfonic acid in a 50 percent aqueous solution to the mixing head. At the mixing head an amount of phenolsulfonic acid in the range of about 6 PHR to about 8 PHR is mixed with the emulsion. These components are mixed at the mixing head and deposited through a nozzle onto a conveyor belt. The nozzle traverses the conveyor belt and deposits the catalyzed emulsion on the width of the belt. On the conveyor belt the catalyzed emulsion begins to foam. The conveyor belt carries the foaming substance a distance until foaming is complete. Then the conveyor belt carries the phenolic foam into an oven zone wherein the phenolic foam is cured at a temperature in the range of about 60° C. to about 100° C. for about 10 minutes. The foamed bun produced after curing may be cut in any fashion known to those skilled in the art to provide foam board suitable for the insulation market and construction industry.

Figure 2:
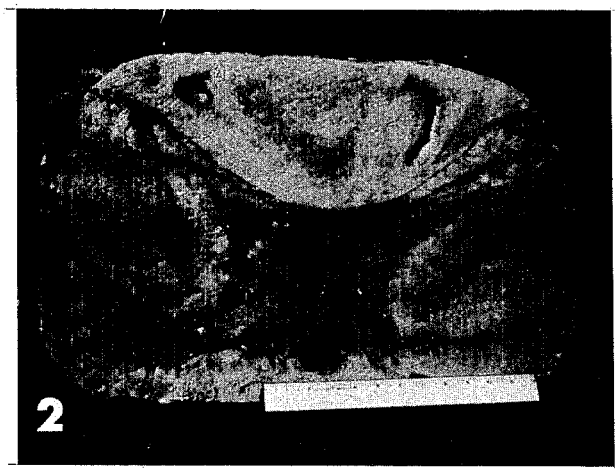
FIG. 2 is a photograph showing the grain structure of a cross section of a phenol-aldehyde foam billet made in the same manner and at the same conditions as the foam billet from which the cross section for FIG. 1 was taken except N-methyl-2-pyrrolidone was not used.

FIGS. 1 and 2 show cross sections of phenol-aldehyde foam buns. FIG. 1 shows a foam where N-methyl-2-pyrrolidone was used in accordance with the present invention. FIG. 2 shows a foam produced under the same conditions with the same components as FIG. 1 except N-methyl-2-pyrrolidone was not used. The foam in FIG. 2 is uneven and contains may blow holes, voids and splits. In comparison, the foam of FIG. 1 has a uniform appearance and cell structure and is substantially free of splits, voids or blow holes.

Figure 3:
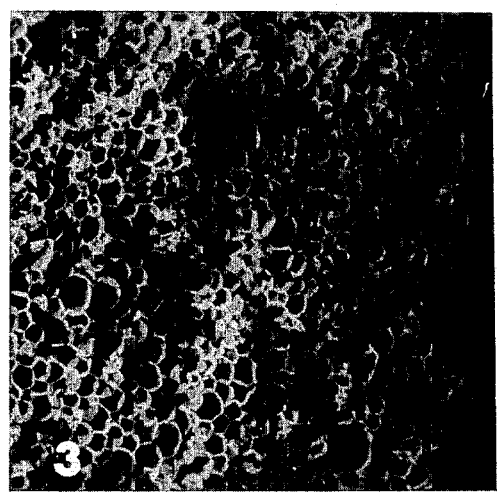
FIG. 3 is a scanning electron photomicrograph at a magnification of 40X showing a traverse section of the cross section of FIG. 1 where N-methyl-2-pyrrolidone was incorporated into the foamable resin mixture in accordance with the present invention.
Figure 4:
FIG. 4 is a scanning electron photomicrograph at a magnification of 40X showing a traverse section of the cross section of billet of FIG. 2 where N-methyl-2-pyrrolidone was not used.

FIGS. 3 and 4 compare the cell structure of the foams in FIGS. 1 and 2 at a magnification of 40X from a scanning electron photomicroscope. The foam produced with the use of N-methyl-2-pyrrolidone in FIG. 3 has a smaller and much more uniform cell structure than the cell structure of the foam produced without the use on N-methyl-2-pyrrolidone shown in FIG. 4. The cell structure shown in FIG. 3 has very few broken windows whereas the cell structure in FIG. 4 has many broken windows. Some of these windows in the first visible layer may have been destroyed in preparing the sample for microscopy, but the windows in the subsequent visible layers were most probably destroyed in foaming. It is believed that the N-methyl-2-pyrrolidone protects the windows of the cell from breaking during the foaming operation.

Figure 5:
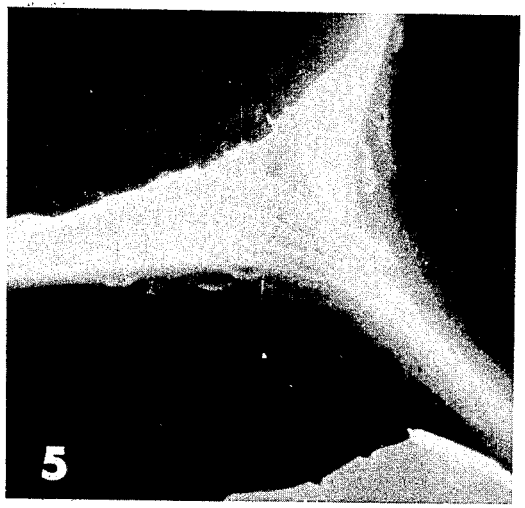
FIG. 5 is a scanning electron photomicrograph at a magnification of 1800X showing a strut between cells of a phenolformaldehyde foam as pictured in FIG. 3 where N-methyl-2-pyrrolidone was incorporated into the foamable resin mixture in accordance with the present invention.
Figure 6:
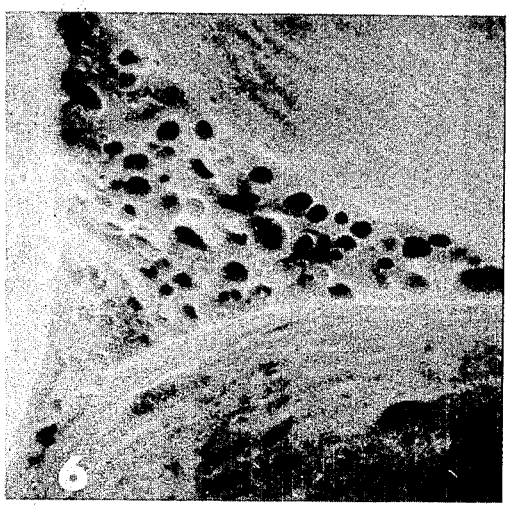
FIG. 6 is a scanning elecron photomicrograph at a magnification of 1800× showing a strut between cells in the phenol-aldehyde form as pictured in FIGS. 2 and 4 where N-methyl-2-pyrrolidone was not used.

FIGS. 5 and 6 compare the struts between cells of the foams of FIGS. 1 and 2 under an electron microscope at a magnification of 1800X. The strut of the foam produced with the use of N-methyl-2-pyrrolidone, shown in FIG. 5, contains very few holes. In comparison, the strut of the foam produced without the use of N-methyl-2-pyrrolidone, shown in FIG. 6, contains many holes and is thicker than the strut of FIG. 5.

FIGS. 3 and 5 show the more uniform cell structure of a foam produced with the use of N-methyl-2-pyrrolidone in accordance with the present invention over a foam produced without the use of N-methyl-2-pyrrolidone. The more uniform cell structure of the foam gives the more uniform appearance of foam as shown in FIG. 6. The more uniform cell structure also leads to better mechanical and thermal properties of the foam produced with the use of N-methyl-2-pyrrolidone in accordance with the present invention in comparison with other phenol-aldehyde foams.

The following examples are illustrative of the process of the present invention for producing a phenol-aldehyde foam, but are not to be construed as limiting the scope thereof in any manner.

EXAMPLE I

To 40 lbs. of phenol formaldehyde resole resin, having a viscosity of 5000 cps at 25° C., solids content of 82%, and a specific gravity of 1.24, there was added 12¾ ounces of silicone surfactant (Dow Corning DC193) and 4 lbs. of a solution made up of a 80/20 blend of 1,1,2-trichloro-1,2,2,-trifluoroethane and N-methyl-2-pyrrolidone. The surfactant and fluorocarbon/pyrrolidone mixture were agitated into the resole with a paddle type mixer to form a stable emulsion.

This emulsion was then metered to a urethane mix head (Admiral Equipment Co. Model 100-3P) at 32° C. and continuously mixed with a 65% solution of phenolsulfonic acid at a ratio of 100/8.4, at a mixer r.p.m. of 2300, and an overall throughput rate of 18.7 lbs./minute.

The resulting foaming mixture was deposited on a kraft paper covered conveyor moving at a rate of 6 ft./minute, and formed into a bun 24 inches wide, 15 ft. long and approximately 12 inches high.

Curing time of the foam was 5½ minutes. Finished product had a density of 1.8 pcf, a compressive strength of 15.7 psi. The foam billet was of a uniform fine celled structure with no internal splits or blow holes, and was suitable for sawing into planks or boards for insulation.

EXAMPLE II

To 100 lbs. of phenol formaldehyde resole resin, having a viscosity of 32,000 cps. at 25° C., a solids content of 82%, and a specific gravity of 1.25, there was added 1 lb. of silicone surfactant Dow Corning DC193. This mixture was blended until uniform and heated to 35° C.

To 100 parts of this mixture, known as Component A, was added 10.0 parts of a Component B, consisting of a 95/5 blend of 1,1,2-trichloro-1,2,2-trifluoroethane and N-methyl-2-pyrrolidone, and 10.5 parts of a Component C, a 65% aqueous solution of phenolsulfonic acid.

Components A, B, and C were continuously mixed in the stated ratios in a urethane mix head Model C-60-2 produced by Afros s.r.l. of Varese, Italy. The mixer was operated at 5500 r.p.m. with a combined flow rate of 36.2 lbs./min.

The resulting foam had a cream time of 60 sec. and a rise time of 220 seconds. The density was 2.1 lbs./cu.ft. and the compressive strength was 26 psi. The foam was molded into polyethylene containers of 1900 cc. capacity. The foam was uniform and of a fine texture without voids, tears or blow holes.

EXAMPLE III

To 100 pounds of foamable phenol-aldehyde resole No. 6267 (Union Carbide) was added 2 pounds of No. 5420 (Union Carbide) silicone surfactant and 2 pounds N-methyl-2-pyrrolidone. This mixture was pumped to a continuous mixing head at the rate of 7.38 pounds/minute. From a second tank, a 90/10 mixture of phenolsulfonic acid solution (65%) and phosphoric acid solution (85%) was pumped to the mixing head at the rate of 0.84 pounds/minute. A third tank containing a blend of 1 percent of No. 5340 silicone surfactant (Union Carbide) and 99 percent Refrigerant 11 was pressurized to 30 psi and delivered to the mixing head through a flow meter at the rate of 1.44 pounds/minute.

The ratio of the three streams was 100/11.4/19.5 and the combined flow rate was 9.66 pounds/minute.

This mixture was deposited on a continuous laminator and foamed into boardstock having a density of 2.67 pounds/cubic foot and a fine uniform cell structure.

The above description and examples illustrate an advance in the art of foamed phenol-aldehyde resins. Previously phenol-aldehyde resin foams have not penetrated the insulation market because the foams did not have a uniform cell structure or appearance, and contained blow holes, voids and splits. The present invention, by using N-methyl-2-pyrrolidone, produces a foam with an increased uniform cell structure and appearance. This foam has improved mechanical and thermal properties and would be ideal for use in the insulation field and many other fields.

According to the provisions of the patent statutes, the principle, preferred construction and mode of operation have been explained and what is considered to represent its best embodiment has been illustrated and described. However, it should be understood that within the scope of the appended claims, the invention may be practiced otherwise than as specifically illustrated and described.

What is claimed is:

1. A process for preparing phenolic foam comprising:
    (a) preparing a foamable mixture comprising a foamable phenol-aldehyde resin, a blowing agent, and N-methyl-2-pyrrolidone;
    (b) foaming the mixture by adding an acid catalyst; and
    (c) curing the phenolic foam.

2. An improved process for preparing phenolic foam comprising foaming a phenol-aldehyde resin in the presence of N-methyl-2-pyrrolidone.

3. A method as in claim 1 or 2 wherein the N-methyl-2-pyrrolidone is present in concentrations of from 0.25 to 5.0 PHR.

4. A foamable mixture for preparing phenolic foams comprising a foamable phenol-aldehyde resin, a blowing agent, and N-methyl-2-pyrrolidone.

* * * * *